United States Patent
Asch et al.

(10) Patent No.: US 9,658,684 B2
(45) Date of Patent: May 23, 2017

(54) METHOD AND SYSTEM FOR AUTOMATICALLY CAPTIONING ACTIONS IN A RECORDED ELECTRONIC DEMONSTRATION

(71) Applicant: Adobe Systems Incorporated, San Jose, CA (US)

(72) Inventors: Arlyn Asch, San Diego, CA (US); Bjorn Pedersen, San Diego, CA (US); Magnus Nirell, Solana Beach, CA (US); Qian Zhang, San Diego, CA (US)

(73) Assignee: Adobe Systems Incorporated, San Jose, CA (US)

( * ) Notice: Subject to any disclaimer, the term of this patent is extended or adjusted under 35 U.S.C. 154(b) by 694 days.

(21) Appl. No.: 13/775,176

(22) Filed: Feb. 23, 2013

(65) Prior Publication Data
US 2013/0205207 A1    Aug. 8, 2013

Related U.S. Application Data (63) Continuation of application No. 10/803,290, filed on Mar. 18, 2004, now Pat. No. 8,386,928.

(51) Int. Cl.
*G06F 3/01* (2006.01)
*G09B 19/00* (2006.01)

(52) U.S. Cl.
CPC ............ *G06F 3/01* (2013.01); *G09B 19/0053* (2013.01)

(58) Field of Classification Search
CPC ........ G06F 3/01; G06F 3/048; G09B 19/0053
See application file for complete search history.

(56) References Cited

U.S. PATENT DOCUMENTS

| | | |
|---|---|---|
| 5,745,738 A | 4/1998 | Ricard |
| 5,826,102 A | 10/1998 | Escobar et al. |
| 5,850,548 A | 12/1998 | Williams |
| 6,020,886 A | 2/2000 | Jacober et al. |
| 6,029,159 A | 2/2000 | Zorba et al. |
| 6,167,562 A | 12/2000 | Kaneko |
| 6,246,404 B1 | 6/2001 | Feiger et al. |
| 6,404,441 B1 | 6/2002 | Chailleux |
| 6,467,080 B1 | 10/2002 | Devine et al. |
| RE38,432 E | 2/2004 | Fai et al. |
| 7,086,032 B2 * | 8/2006 | Nirell et al. ................. 717/113 |
| 2002/0035478 A1 | 3/2002 | Levitt et al. |

(Continued)

OTHER PUBLICATIONS

Non-Final Office Action mailed Apr. 12, 2010 in U.S. Appl. 11/496,703, 10 pages.

(Continued)

*Primary Examiner* — Angie Badawi
(74) *Attorney, Agent, or Firm* — Kilpatrick Townsend & Stockton LLP (57) ABSTRACT

A system and method are disclosed for automatically captioning an electronic demonstration using object properties captured from the operating system. In response to an action that is initiated by a demonstrator, the operating system is queried to obtain the property information for the target object to which the action is directed as well as the parent object of the target object. This property information is then used to generate explanatory captions that are displayed to a user or trainee during the playback of the electronic demonstration.

13 Claims, 9 Drawing Sheets

(56) References Cited

U.S. PATENT DOCUMENTS

| | | |
|---|---|---|
| 2002/0147746 A1 | 10/2002 | Lee |
| 2003/0084401 A1 | 5/2003 | Abel et al. |
| 2004/0128614 A1 | 7/2004 | Andrews et al. |
| 2004/0219494 A1 | 11/2004 | Boon |
| 2005/0060719 A1* | 3/2005 | Gray .................... G06F 9/4443 719/318 |
| 2005/0193425 A1 | 9/2005 | Sull et al. |

OTHER PUBLICATIONS

OLDS "Techsmith's Camtasia, SnagIt and Dubit", Designer Today, May 2, 2002, 10 pages.
Response dated Mar. 20, 2006 in U.S. Appl. No. 10/370,271, including Declarations of Cecil Kift and Magnus Nirell, 6 pages.
Exhibit A to Kift/Nirell Declarations, Shannon, eHelp "RoboDemo Version 3.0 Installation Guide", 2002, 74 pages.
Exhibit B to Kift/Nirell Declarations, eHelp "RoboDemo Version 3.0 Installation Guide" 2002, 14 pages.
Exhibit C to Kift/Nirell Declarations, RoboDemo 3.0 Press Relase, 2002, 2 pages.
Office Action in U.S. Appl. No. 10/370,271, mailed Oct. 20, 2005, 9 pages.
Notice of Allowance in Related U.S. Appl. No. 10/803,290, dated Oct. 25, 2012, 10 pages.
Appeal Board Decision in Related U.S. Appl. No. 10/803,290, Appeal 2012-002092, dated Jan. 13, 2012, 12 pages.
Reply Brief to Examiner Answer in Related U.S. Appl. No. 10/803,290, dated Aug. 29, 2011, 10 pages.
Examiners Answer to Appeal Brief in Related U.S. Appl. No. 10/803,290, dated Jun. 27, 2011, 13 pages.
Appeal Brief filed in Related U.S. Appl. No. 10/803,290, dated Mar. 31, 2011, 33 pages.

\* cited by examiner

*FIG. 1*

| ID | ROLE | NAME | RECTANGLE | PARENT |
|---|---|---|---|---|
| 101 | WINDOW | "SOME APPLICATION WINDOW" | 20,20,600,800 | NULL |
| 102 | DIALOG | "APPLICATION DIALOG BOX" | 200,127,340,600 | 101 |
| 104 | BUTTON | "A BUTTON" | 400,512,450,543 | 102 |
| 105 | BUTTON | "B BUTTON" | 400,550,450,581 | 102 |

700 — EXAMINE TARGET ROLE

701 — EXAMINE TARGET PARENT ROLE

702 — EXAMINE ACTION TYPE

703 — SELECT CAPTION TEMPLATE BASED ON ROLES AND ACTION TYPE

704 — FILL IN CAPTION TEMPLATE WITH TARGET NAME AND TARGET PARENT NAME

METHOD AND SYSTEM FOR AUTOMATICALLY CAPTIONING ACTIONS IN A RECORDED ELECTRONIC DEMONSTRATION

CROSS-REFERENCE TO RELATED APPLICATION

This application is a continuation application of U.S. patent application Ser. No. 10/803,290 filed on Mar. 18, 2004, the contents of which are incorporated herein by reference in their entirety.

TECHNICAL FIELD

The present invention relates, in general, to electronic demonstration systems, and, more specifically, to automatically captioning actions in such systems.

BACKGROUND OF THE INVENTION

Computers and computer technology have greatly increased the efficiency and capability of the individuals who use them. What historically required hours of re-typing and reams of carbon paper 30 years ago, can now typically be accomplished in minutes by a single person operating a word processing application. Spreadsheets, word processors, publishing software, electronic mail, and the like, each add some level of increased capability and simplicity to a user's life. However, with this increased capability a new responsibility has been added to the user: learning how to use this software.

An increase in software training techniques has closely followed the increased use and availability of such productivity software applications. In its simplest form, training is essentially the process of drafting a large user's manual and letting the user read through it to learn the operation of the product. However, a relatively large amount of time may be expended reading through a manual in order to find out specifics on how to operate a given product to perform a specific, desired task. Today, software training, at least in the context of corporations or businesses may be maintained and directed by Information Technology (IT) trainers.

An IT trainer may attempt to train people how to use various software applications, such as email, word processors, and the like, being used at the business. These IT trainers may provide a helpdesk to field calls or questions from employees asking how to perform specific tasks on the software product. Additionally, IT trainers may take a more proactive approach by providing written materials to people explaining and demonstrating the use of the specific product or the steps to take to perform a specific task. One solution for developing such materials would be to write the explanations and steps into a word processing document for distribution to the users. These how-to guides may include screen shots indicating how the product will respond with pop-up windows or dialog boxes along with explanations of what the user should do in response to the pop-up windows, dialog boxes, or the like.

Software applications have been developed to assist IT trainers in creating these instructional materials by recording the demonstrator's or trainer's interaction with the actual software product being demonstrated. Examples of such demonstration development environments include MACROMEDIA INC.'s ROBODEMO™, TECHSMITH CORPORATION'S CAMTASIA™, QARBON, INC.'s VIEWLETBUILDER™, and the like. Demonstration development software allows trainers to record actual simulations of the software to be demonstrated in order to demonstrate that software or how to use a particular feature of that software. The resulting recorded demonstration can then be made available to the users either electronically or on paper. In the electronic media, demonstration applications, such as ROBODEMO™, may record the trainer interaction onto an interactive multimedia movie file that may be played on a user's computer using an interactive multimedia runtime container (iMRC), such as MACROMEDIA INC.'s MACROMEDIA FLASH™ PLAYER.

For example, if instruction is to be given on how to attach a file to an email message, the trainer starts the demonstration development environment, starts the email program and begins with a screen shot of an e-mail message. As the trainer interacts with the email program, the demonstration software records the mouse moving up and clicking on the "Attach" icon, and the other steps for attaching the file. Once the recording is stopped, the trainer may then add captions that explain the various steps and movements that were made in performing the desired task. Captions, such as "Select the Attach Icon," "Select the Browser Button," and the like, may be added to the screen shot to textually inform the user what actions are to be taken. Adding captions to the screen shots provides a visual assistance to the user in seeing and being informed of the actual process step being demonstrated on a particular screen shot. However, trainers or demonstration developers expend considerable time and effort editing a demonstration file to add such captions.

BRIEF SUMMARY OF THE INVENTION

The present invention is directed to a system and method which queries the operating system for properties of the window and objects that are interacted with during the recording of a demonstration presentation. The system then uses those properties to automatically generate and display related captions describing the interactions. For example, if the interaction is to click on an OK button, the properties that the system and method saves may be that this window or object is of class button, and is in a particular location on the display, and has a particular text on it that states "OK." Furthermore, the demonstration system queries the operating system for the properties of the parent object, such as that the OK button is located on a dialog. The system records that the parent object is of class dialog, and that the dialog has a particular title, such as "Print," or the like, and that the dialog is attached to a particular application, which has a title, such as MACROMEDIA FLASH™, MICROSOFT WORD™, or the like. The demonstration system captures and saves all of this property information from the operating system.

Once the demonstrated steps are recorded and all of the property information is captured, the demonstration system creates the demonstration presentation. During this creation process, the demonstration application uses the captured property information to automatically generate captions that describe the particular action that was performed and recorded by the demonstrator. These captions are then included in the demonstration presentation file, such that when a user replays the demonstration, the generated captions appear on the screen and inform the user of what actions are taking place in the demonstration. Using the example from above, a caption may be generated and displayed stating, "Select the OK button on the Print dialog in the MACROMEDIA FLASH™ application." This is only one example of the caption that could be created. Others could be created that were not as detailed, such as "Select the OK button," or "Select the Button," or that merely defined the object, such as, "This is the OK button."

A caption may also take the form of a visual or sound cue. Using the example properties referred to above, instead of generating a textual caption, a visual or audible cue may be rendered for the OK button. For example, a visual object may be created to overlay the OK button causing it to be highlighted in a specific color or wash of color. Similarly, a sound object may be generated that plays a "ping" or other type of audible sound when associated with a particular object, such as the OK button, within the demonstration window. However, each of these captions or cues is generated or selected using the information gained through the capture of the object properties.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
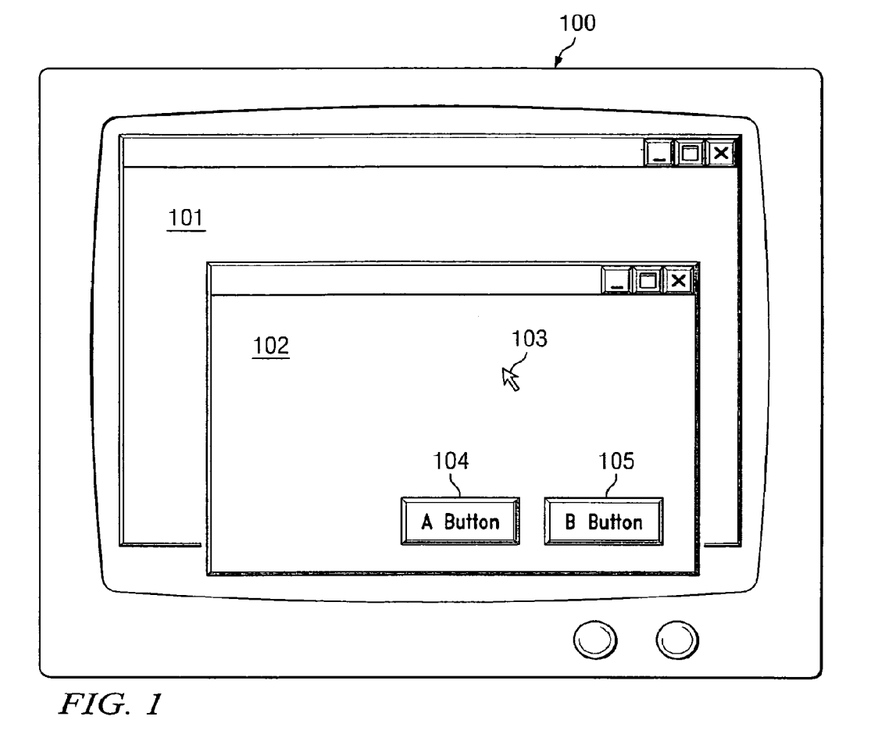
FIG. 1 is an illustration of a computer display having a number of interface elements displayed thereon.

FIG. 1 is an illustration of computer display 100 having a number of interface elements displayed thereon. In a typical example of operating a software application, application window 101 is displayed on computer display 100. During some action or interaction with the application, application dialog box 102 is displayed over application window 101 with pointer 103 hovering over application dialog box 102. Application dialog box 102 may also include interface elements, such as buttons 104 and 105. Within the operating system driving computer display 100, each of application window 101, application dialog box 102, and buttons 104 and 105 comprise software objects or windows that are rendered on computer display 100. Each such object or window comprises a set of object properties that are maintained by the operating system.

Certain operating systems, such as MICROSOFT CORPORATION's WINDOWS, and the like, use an open object model (OOM). In an OOM, each window or object that is on the screen, whether visible or invisible, is shown in the code representation of the system. A window or object in such an OOM is a standard construct in the operating system and has a standard set of properties. A property may be the title of the window, or it may be the size and position of the window, or even a window class. Whether the window or object is a button, a region, a window, or the like, the operating system maintains a list of object properties that includes each property to that particular window or object. Therefore, each window that is on a display in the operating system has a window name, a class, a size, a position, and the like, which is open for access to any other program or application that runs in that operating system.

Figure 2:
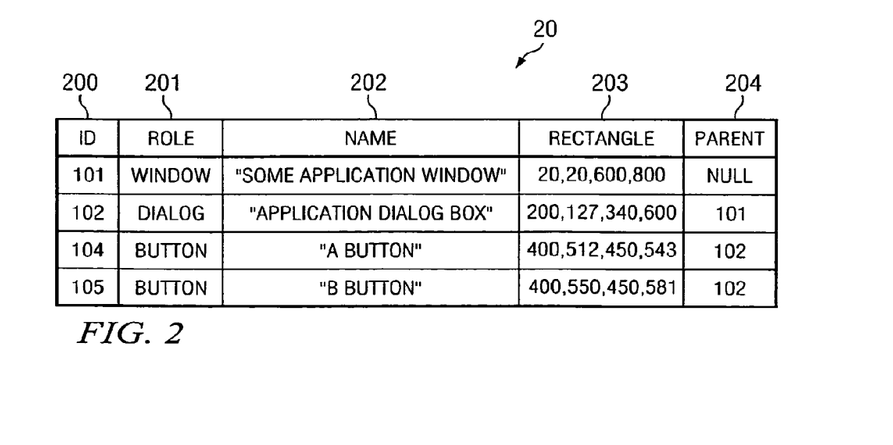
FIG. 2 is a table illustrating a typical data structure of object properties maintained by the operating system in displaying the object depicted in FIG. 1.

FIG. 2 is a table illustrating typical data structure 20 containing object properties maintained by the operating system in displaying the object depicted in FIG. 1. Data structure 20 includes a set of properties defining the particular object, such as object identification (ID) 200, which is the unique identifier of the particular object; role 201, which is the type of object or the object's role in the application; name 202, which may be the text located on the object's title bar or the text on a button; rectangle 203, which defines the size and relative location of the object through its coordinates; and parent 204, which is the relationship between the particular object with its surrounding. Other properties may be kept by the various operating systems; however, data structure 20 is shown for purposes of the example of FIG. 2. For purposes of this example, ID 200 for each of the objects depicted in FIG. 1 is noted as the element number in FIG. 1. It should be noted that ID 200 may be any identification assigned by the operating system.

For example, application window 101 is shown as a window (role 201), having the text "Some Application Window" (name 202), with rectangle coordinates 20,20,600, 800 (rectangle 203). Because application window 101 is the main application window, its parent 204 is shown as "NULL." Similarly, button 104 is shown as a button, role 201, having the text "A Button," name 202, with rectangular coordinates 400,512,450,543, rectangle 203. Parent 204 for button 104 is shown as "102." Therefore, button 104 is known as a child object of application dialog box 102. The operating system maintains data structure 20 for each object on its display. It should be noted that FIG. 2 uses the element numbers in parent 204. These numbers are used solely for the convenience of this example. In practice, various operating systems may assign other types of identifiers to each object.

Figure 3:
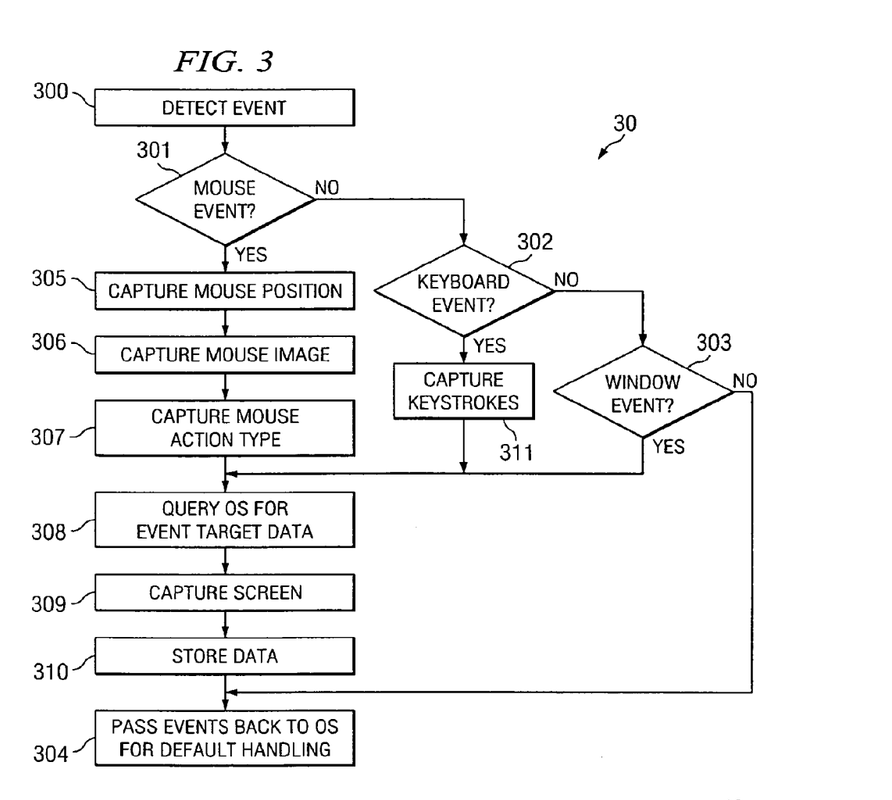
FIG. 3 is a flowchart illustrating example steps for the capture process in one embodiment of the present invention.

FIG. 3 is a flowchart illustrating example steps for capture process 30 in one embodiment of the present invention. In general, a process demonstrating steps in operating a computer application or for performing a specific task in the application will monitor mouse events, such as the movement and clicks, keyboard events, such as typing or selecting particular keys, and window events, such as a dialog box popping up. In step 300, an event is detected. A determination is made, in step 301, whether the event was a mouse event. If so, the position of the mouse is captured in step 305. The mouse image, which is an icon or figure that represents the mouse, such as an arrow, a finger, or the like, is captured in step 306. The demonstration system also captures the type of mouse event, such as a single click, double-click, right-click, or the like, in step 307. In step 308, the operating system is queried to determine the properties or data maintained by the operating system related to the target event. This data is the data maintained by the operating system in data structure 20 (FIG. 2). The screen is captured in step 309 with all of the data collected for the detected mouse event being stored in step 310.

If the detected event is not a mouse event, a determination is made, in step 302, whether the event was a keyboard event. If so, each of the keystrokes is captured in step 311. Steps 308-310 are repeated for the keyboard event, with all of the data related to the keyboard event being stored in step 310. If the detected event is not a keyboard event, a determination is made, in step 303, whether the event was a window event. Because a window event is something that is initiated by the application or operating system, if the determination is made that the event is a window event, the demonstration system goes directly to step 308 to query the operating system for the data related to the target event. Steps 309 and 310 are also repeated, with the data related to the window event being saved in step 310.

Figure 4:
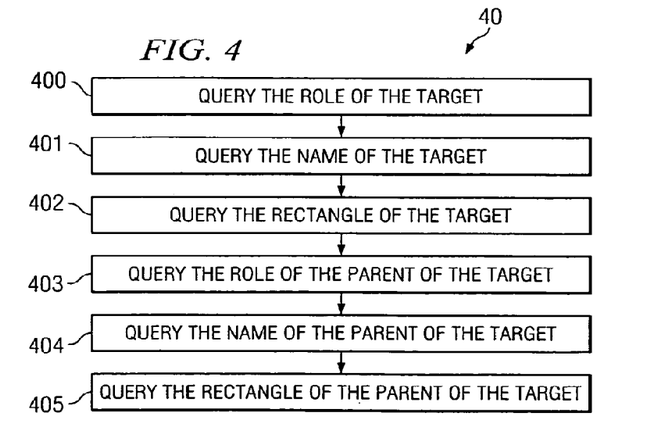
FIG. 4 is a flowchart illustrating example steps used for implementing the operating system query step depicted in FIG. 3 for another embodiment of the present invention.

FIG. 4 is a flowchart illustrating example steps used for implementing operating system query step 308 depicted in FIG. 3 for another embodiment of the present invention. In step 400, the role of the target event is queried. The target event is the mouse event, keyboard event, or window event that was detected. In step 401, the name of the target event is queried. The rectangle of the target event is then queried in step 402. Because the target event may be an event directed to an object that exists as a child of another object of the application, the role of the parent is queried in step 403. For example, a mouse event may be detected as the demonstrator selects the "OK" button on a Print Dialog Box. The "OK" button is the target object. Merely capturing the operating system information on the target object may not provide sufficient information to the trainee. The name of the parent is queried in step 404, followed by the rectangle of the parent being queried in step 405. With data for both the target and parent objects, the demonstration system can compile a caption that states, "Select the 'OK' button of the Printer Dialog Box." This provides much more intuitive instruction to the user than a dialog merely stating, "Select the 'OK' button."

Figure 5:
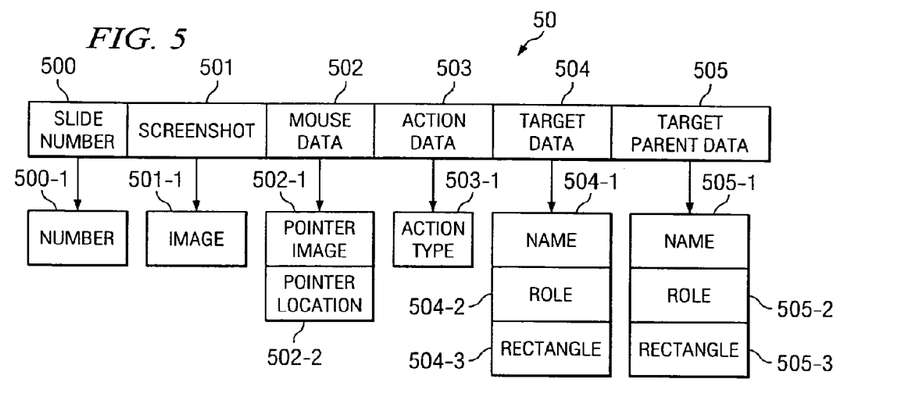
FIG. 5 is a block diagram illustrating a demonstration data structure incorporating the captured target event data.

FIG. 5 is a block diagram illustrating demonstration data structure 50 incorporating the captured target event data. Demonstration data structure 50 is compiled for the demonstration presentation. Each slide of the demonstration will include some form of text or graphics that replays the recording of the demonstrated steps. Data is, therefore, associated with each such slide in the presentation. Demonstration data structure 50 includes slide number field 500, screenshot field 501, mouse data field 502, action data field 503, target data field 504 and target parent data field 505. The fields in demonstration data structure 50 are populated with the data that was captured in capture process 30 (FIG. 3) and, in more detail, operating system query step 308 (FIG. 4). Number 500-1 is assigned by the demonstration system for each particular slide. Number 500-1 may be used to index the slides and the information contained within the slides and may be used to order the slides. Image 501-1 represents the image of the screen shot capture during the target event. Mouse data field 502 includes pointer image 502-1 and pointer location 502-2, which is the information regarding the position of the pointer during the event. Action type 503-1, stored in action data field 503, maintains the type of action that the event was, such as a button click, double-click, and the like. Target data field 504 includes name 504-1, role 504-2, and rectangle 504-3. When used in conjunction with name 505-1, role 505-2, and rectangle 505-3, stored in target parent data field 505, a caption may be formulated that describes the action that was demonstrated.

Figure 6:
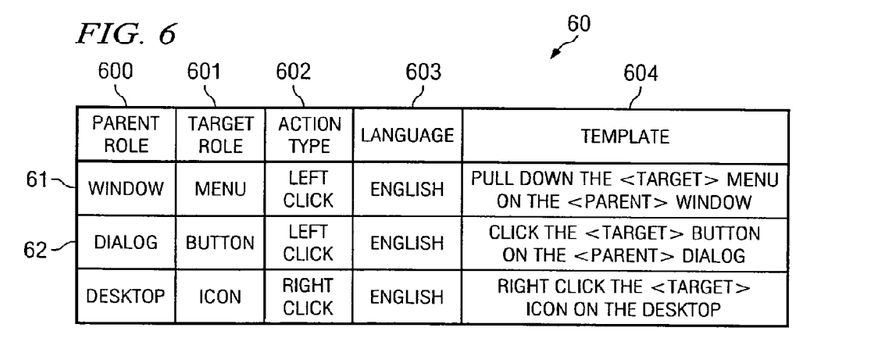
FIG. 6 is a block diagram illustrating a caption template database used in generating an event caption in one embodiment of a demonstration application configured according to the teachings of the present invention.

FIG. 6 is a block diagram illustrating caption template database 60 used in generating an event caption in one embodiment of a demonstration application configured according to the teachings of the present invention. Caption template database 60 is a list of pre-drafted captions which are created and stored according to parent role 600, target role 601, action type 602, and language 603. By pre-drafting the caption text, the captions are more likely to be written using the proper grammar for the various languages in which the captions will be presented. For example, template entry 61 indicates a window (parent role 600), a menu (target role 601), a left click (action type 602), in English. Therefore, caption template 604, for this type of event, is shown as "Pull down the <TARGET> menu on the <PARENT> window." Similarly, caption template 604 for template entry 62 would be "Click the <TARGET> button on the <PARENT> Dialog." Placeholder variables are left in the caption text in order to insert the corresponding relevant data, such as the target and parent names, retrieved from the operating system. In practice, caption text is created for practically every possible combination of parent role 600, target role 601, and action type 602. Moreover, each caption template may be created in any desired number of different languages. By providing several different languages, demonstration developers may then record a single demonstration interaction, but then create multiple demonstration presentations by designating different languages in which to create the final demonstration presentation.

It should be noted that the caption templates may be drafted and stored by the demonstration software manufacturer, the IT trainer, or the like. In various other embodiments of the present invention, the software manufacturer may pre-draft these templates, yet allow the demonstrators to modify existing caption templates or create their own caption templates.

It should further be noted that caption template 604 may include both text and an audible, spoken narration of the caption. A spoken narration may be generated from the text using known text-to-speech technology. Additionally or alternatively, respective embodiments of the present invention may also include an audio recording of the spoken caption along with spoken clips for each parent or target type, such as "window," "button," "dialog," and the like. The spoken clips would be inserted into the spoken captions to create the entire audible caption. This is similar to the known techniques used by telecommunication providers in compiling a spoken message of a phone number from clips of the recordings of individual numbers.

Figure 7:
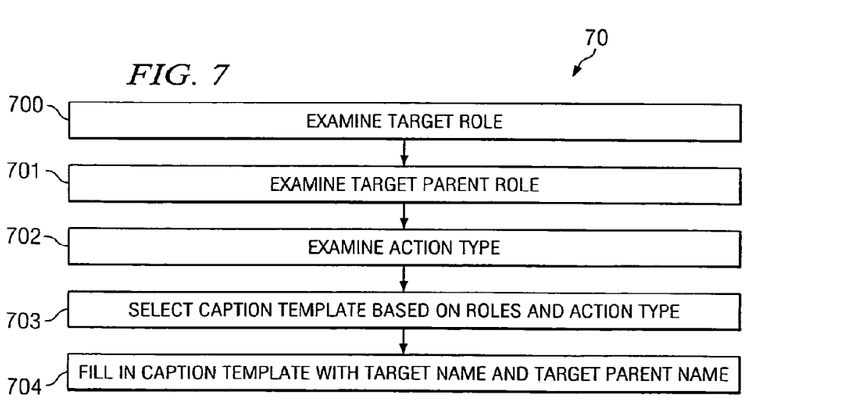
FIG. 7 is a flowchart illustrating the caption generation used in a demonstration application configured according to the teachings of an embodiment of the present invention.

FIG. 7 is a flowchart illustrating caption generation 70 used in a demonstration application configured according to the teachings of an embodiment of the present invention. In step 700, the target role is examined from demonstration data structure 50 (FIG. 5). The parent role is also examined from demonstration data structure 50 (FIG. 5) in step 701. In step 702, the demonstration application then examines the action type from demonstration data structure 50 (FIG. 5). Using the target and parent roles as well as the action type, a caption template is selected from caption template database 60 (FIG. 6) in step 703. The relevant data, such as parent name, target name, and the like, is then inserted into the caption in step 704 before presentation of the completed caption to the user or trainee on the replay of the recorded demonstration.

Figure 8A:
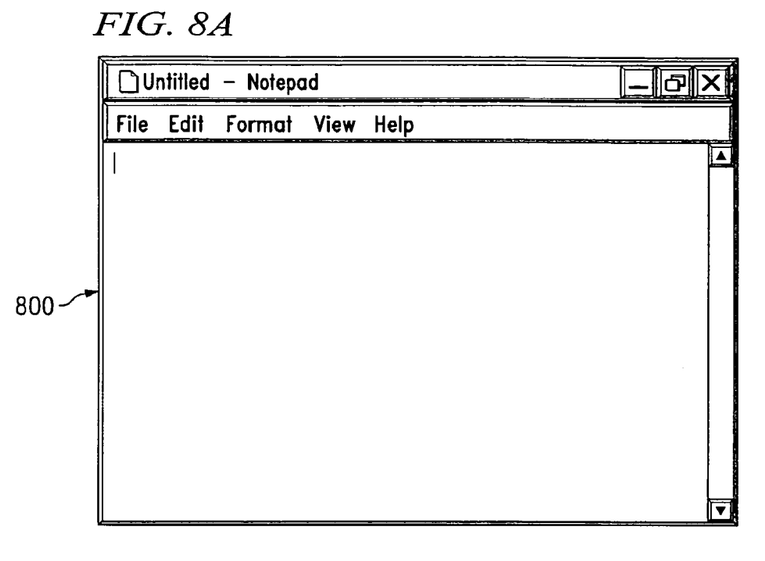
FIGS. 8A-8F are screenshots illustrating an example demonstration being recorded by a demonstrator in a demonstration application configured according to another embodiment of the present invention.
Figure 8B:
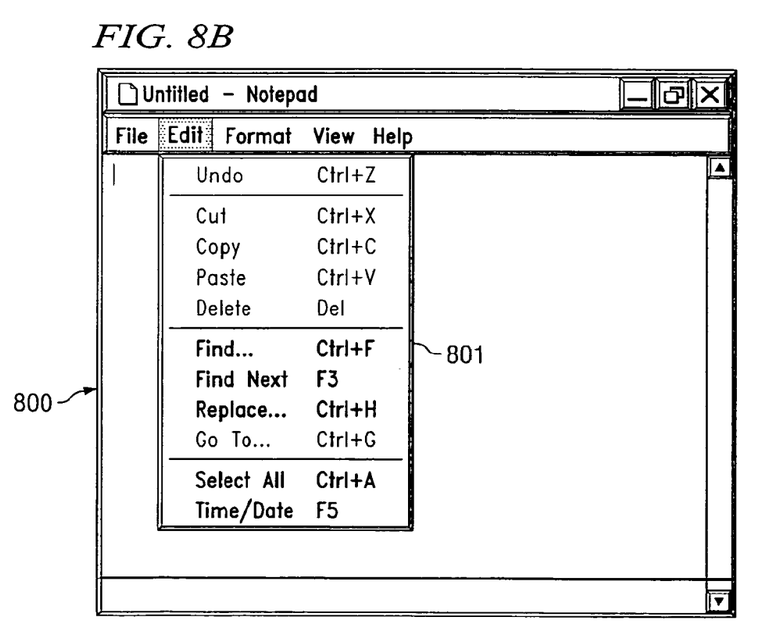
Figure 8C:
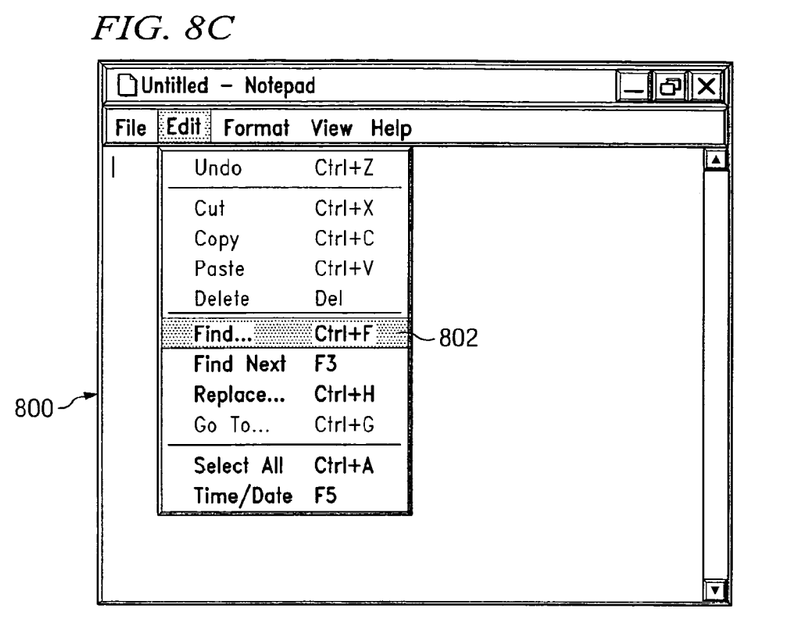

FIGS. 8A-8F are screenshots illustrating an example demonstration being recorded by a demonstrator in a demonstration application configured according to another embodiment of the present invention. Window 800 is captured in FIG. 8A as the demonstrator begins recording the demonstration. FIG. 8B shows pull-down menu 801 displayed on window 800 in response to the demonstrator clicking on the "Edit" menu. The demonstration system would detect a mouse event comprising the mouse located over the "Edit" menu title and a single button click. A window event may also be detected upon the appearance of pull-down menu 801. FIG. 8C shows "Find . . . " selection 802 highlighted as the demonstrator moves to select this choice. The demonstration application would detect a mouse event comprising the mouse position over "Find . . . " selection 802 and a rollover event comprising the highlighting of "Find . . . " selection 802.

Figure 8D:
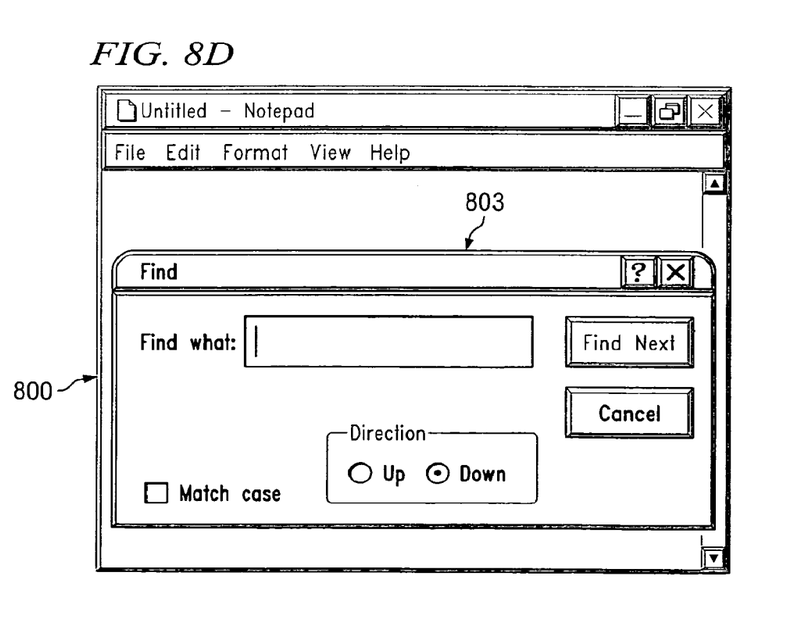
Figure 8E:
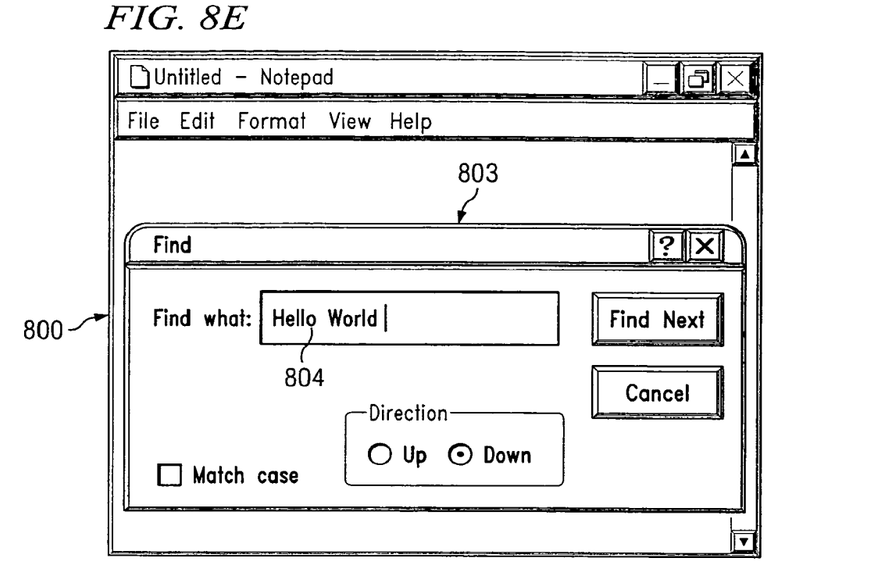
Figure 8F:
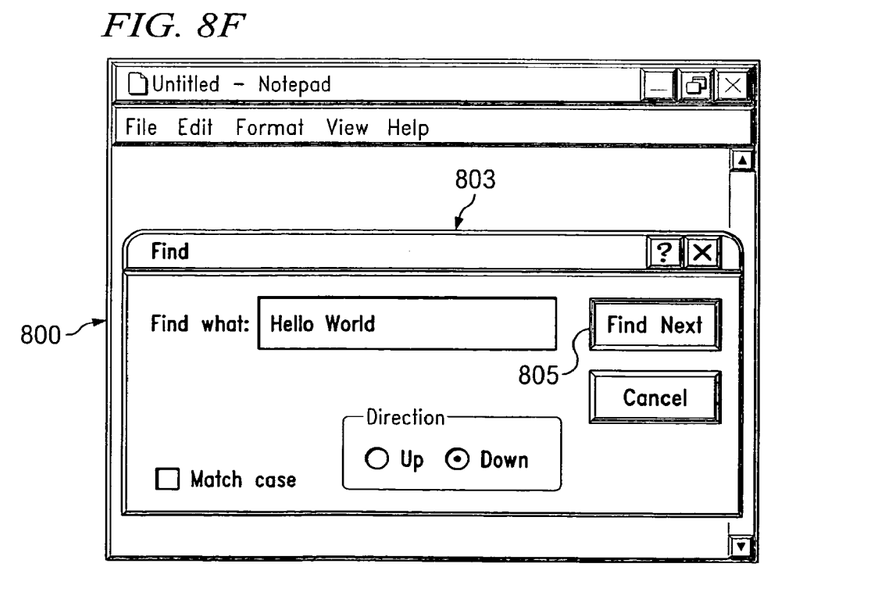

FIG. 8D illustrates find dialog 803 rendered on window 800 after the demonstrator selects "Find . . . " 802 from pull-down menu 801 (FIG. 8C). The demonstration system would detect a mouse event comprising a mouse position over "Find . . . " selection 802 and a single button click. A window event would also be detected on the appearance of find dialog 803 on window 800. FIG. 8E shows text 804, "Hello World," typed into the "Find what:" data field of find dialog 803. The demonstration system detects several keyboard events comprising the key strikes spelling out text 804. FIG. 8F shows the demonstrator selecting "Find Next" button 805 as the final step to the recorded task. The demonstration system detects a mouse event comprising a mouse position over Find Next button 804 and a single button click.

Figure 9A:
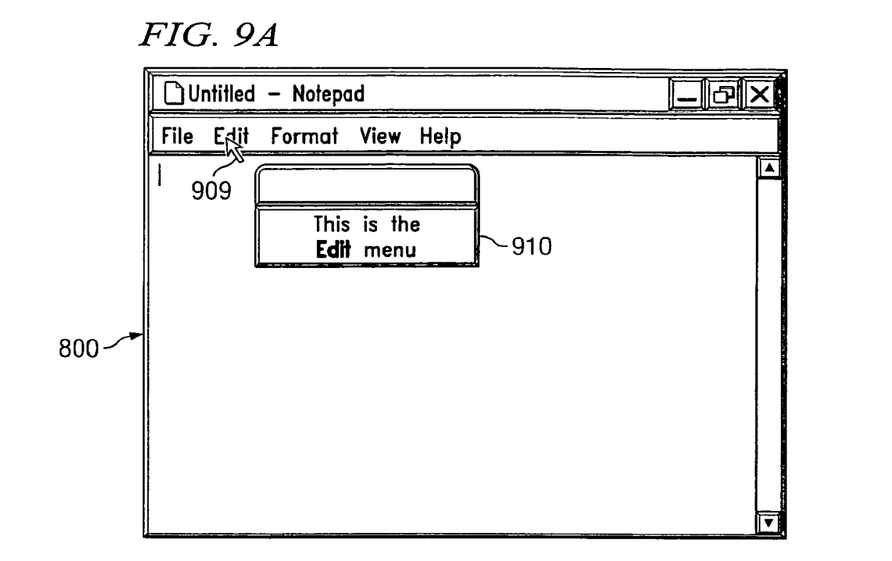
FIGS. 9A-9F are screenshots illustrating the replay of the example demonstration described in FIGS. 8A-8F.

It should be noted that captions are generated and inserted into the slides of the demonstration as it is being compiled into the final demonstration presentation available to the users for replay. FIGS. 9A-9F are screenshots illustrating the replay of the example demonstration described in FIGS. 8A-8F. FIG. 9A begins the replay of the demonstration by displaying window 800. In the next slide of the demonstration depicted in FIG. 9B, pull-down menu 801 is shown on window 800 along with caption box 900. The caption, "Pull down the Edit menu," was generated by the demonstration system using the caption template for pulling down menus and the name of the target object, Edit. Once generated, caption box 900 and the caption text were recorded onto the demonstration file.

Figure 9B:
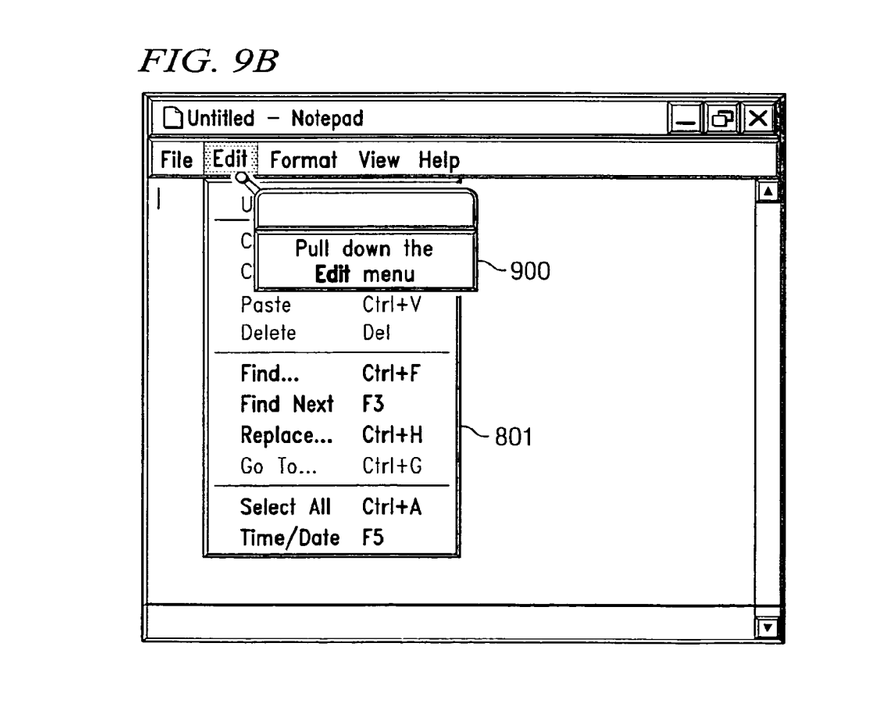

It should be noted that caption box 900 is placed in proximity to the Edit menu. The demonstration application may reference the rectangle property of the target object in demonstration data structure 50 (FIG. 5) in order to determine the location of the target object and then render caption box 900 within a predetermined distance from this location. By creating caption box 900 near the target object, the user's eye is further drawn to the location of the object that he or she is supposed to interact with.

Figure 9C:
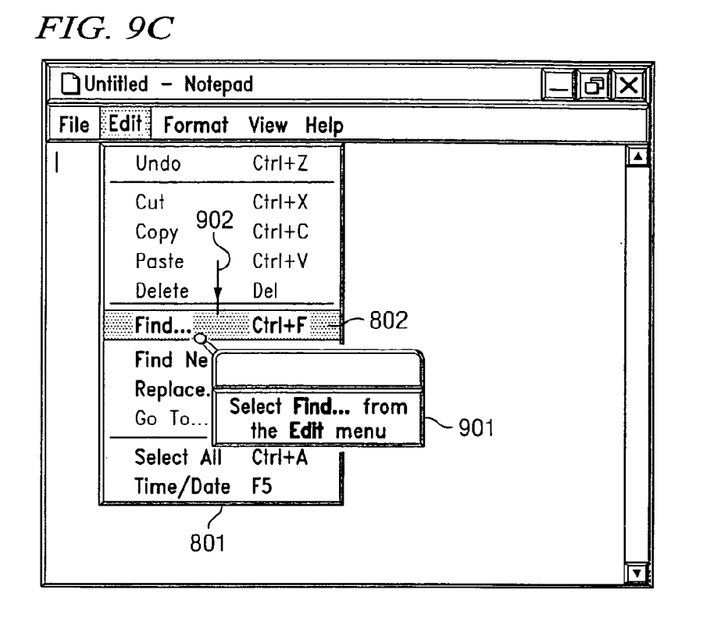

The slide depicted in FIG. 9C illustrates "Find . . . " selection 802 being highlighted on pull-down menu 801. The demonstration application inserted arrow 902 to direct the user's attention to the action being demonstrated and generated caption box 901, with the caption, "Select Find . . . from the Edit menu." It should be noted that arrow 902 may be animated to blink or move or other such visual feature in order to draw the user's attention. Moreover, the arrow may be connected to the caption box or placed in any location desired by the demonstrator. When recording the final demonstration file, the demonstration application used the caption template for selecting a choice from a menu and inserted the names of the target and parent objects to create the caption in caption box 901.

Figure 9D:
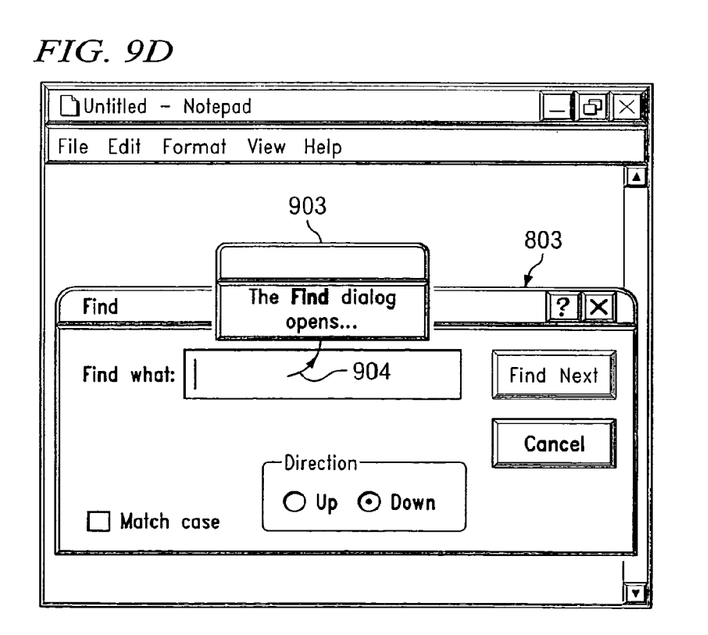

The demonstration slide depicted in FIG. 9D illustrates find dialog 803. The demonstration application generated arrow 904 to draw the user's attention to caption box 903. In recording the final demonstration file, the demonstration application used the template corresponding to a window event and inserted the name of the target window object to create the caption, "The Find dialog opens . . . " presented in dialog box 903.

Figure 9E:
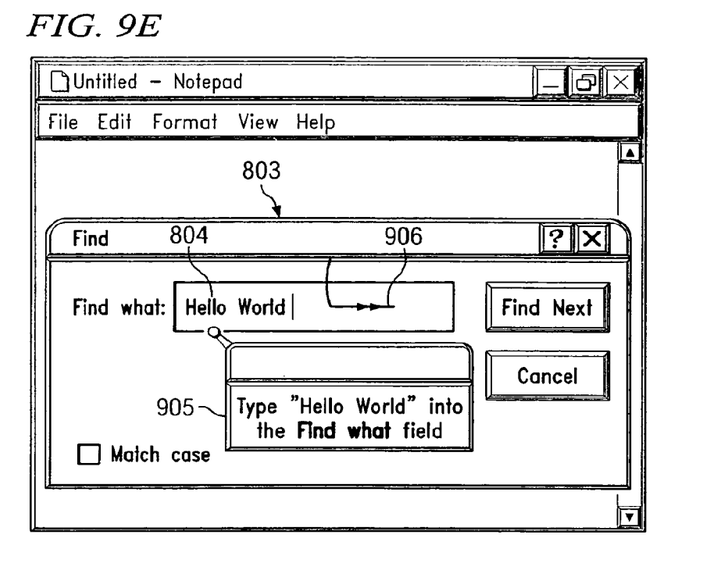

In FIG. 9E, the demonstration slide shows Find dialog 803 with text 804, "Hello World," typed into the Find what: text entry field. The demonstration application created arrow 906 drawing the user's attention to the Find what: text entry field and displayed caption box 905. The caption, "Type 'Hello World' into the Find what field," was generated by the demonstration application by selecting the caption template for a keyboard event within another object and inserting the target and parent object names into the caption template presented in caption box 905.

Figure 9F:
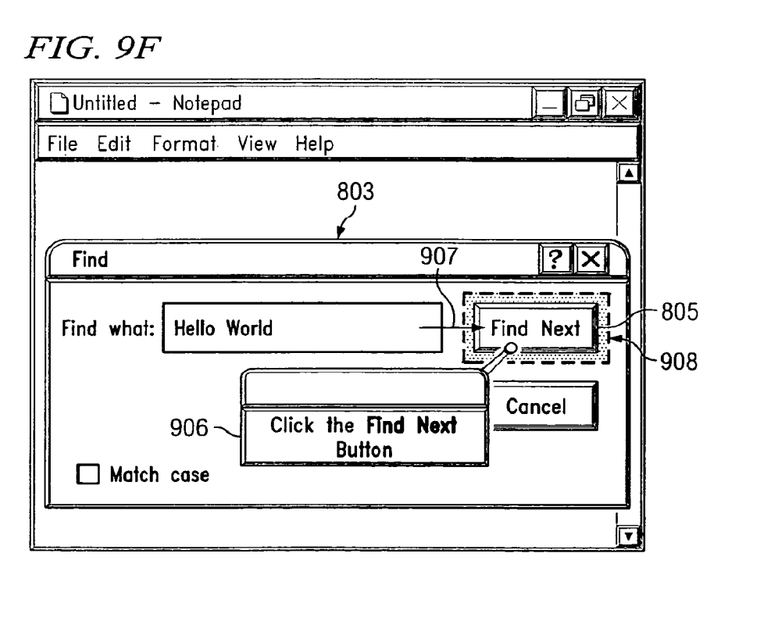

The demonstration slide depicted in FIG. 9F illustrates find dialog 803. Arrow 907, generated by the demonstration application, is used to point the user's attention to Find Next button 805. Caption box 906 is also displayed presenting the caption, "Click the Find Next Button." The demonstration application generated the caption text by selecting the caption template directed to selection of a button object. The target object name, "Find Next," was then inserted into the caption template and displayed on caption box 906.

It should be noted that additional and alternative embodiments of the present invention may include click regions within the demonstration slides of the demonstration presentation. With reference to FIG. 9F, when an event defines some user interaction with a button or text entry field or other such action, the demonstration application may additionally define click region 908 around Find Next button 805. A click region or hot region is an area defined within the demonstration slide that pauses the playback of the demonstration until the user moves the mouse over the particular click region and clicks the mouse button. Thus, click region 908 would pause the playback of the demonstration until the user moved his or her mouse over click region 908 and clicks on the mouse button. The feature allows the user to perform an action that is similar to the action he or she will perform when operating the software or performing the task that the demonstration presentation is demonstrating.

It should further be noted that other types of captions and visual or audible cues may be created and added to the demonstration slides of the demonstration presentation. Referring again to FIG. 9A, during the recording stage, the demonstrator rolled his or her cursor over the Edit selection in the tool bar. During playback, as shown in FIG. 9A, cursor 909 is shown hovering over the Edit selection. Using the object properties captured during the recording, the system generated caption box 910 which contains the informational caption, "This is the Edit menu." Thus, the caption generated does not direct the user to perform any particular task, but, instead, provides information, which was automatically captured from the operating system, to the user.

Audible cues or objects may also be used by the demonstration system to provide information or cues to the user. Referring again to FIG. 9B, caption box 900 includes the text, "Pull down the Edit menu." Instead of merely providing the visual text to the user, the demonstration system may generate a spoken version of the text. Using technology for text-to-speech generation or assembling pre-recorded voice clips of the caption text and properties, the demonstration could assemble a sound object to be played when caption box 900 is displayed. The sound object may be a human voice speaking, "Pull down the Edit menu." Using the voice cue in addition to caption box 900, the user's attention is more vigorously drawn to the action being demonstrated.

Audible cues may also include non-speech sounds, such as clicks, pings, or the like to indicate an action being taken. Referring again to FIG. 9E, the demonstration system may compile a sound object of a typewriter being operated. This sound object may be played as the text, "Hello World," is being placed into the "Find what:" text field. Again, the addition of a sound object draws the user's attention to the action being performed or displayed.

In addition to non-speech audible cues, non-text visual cues may also be used to implement various types of captions or cues. Referring again to FIG. 9F, click region 908 defines the area around Find Next button 805 that the user may interact with. In addition to the area being defined, the demonstration system added coloration to click region 908 to accentuate its location to the user. The demonstration system may add other types of highlighting or accentuating to other objects such as buttons, menus, text fields, or the like in order to further draw the user's attention to something. The particular form of highlighting or accentuation may be defined as relating to a particular action, such as selecting a button, typing and entry, or the like. Thus, the captions and cues that are generated by the demonstration system using the object properties do not necessarily have to be textual or speech-based, but are allowed to be any form that may enhance the user's interaction with the demonstration.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
while recording, via a recording application executed by a processor, a demonstration of an application executed concurrently with the recording application:
detecting an interaction with an interface element of the application;
capturing, by the recording application in response to said detecting the interaction, (i) an image of the interface element as displayed on a display device and (ii) a plurality of object properties associated with the interface element, wherein capturing the plurality of object properties comprises storing values of the plurality of object properties that are generated by the interaction with the interface element during execution of the application;
creating, by the recording application, a demonstration presentation comprising the captured image and a caption describing the interaction, the caption created by:
selecting, by the recording application, a caption template from among a plurality of predefined caption templates based on one or more of the stored values for one or more of the object properties captured by the recording application; and
inserting, by the recording application, a value of a name of the interface element into the caption template, the name being one of the object properties; and
outputting the demonstration presentation on an output device.

2. The method of claim 1, wherein the object properties comprise at least one of a name of the interface element, a role of the interface element, a position of the interface element, a name of a parent of the interface element, a role of the parent of the interface element, or a position of the parent of the interface element.

3. The method of claim 1, wherein capturing the object properties comprises querying an operating system in which the application is being executed in order to obtain the values of the object properties.

4. The method of claim 1, wherein said capturing the object properties further comprises capturing, during the recording, an additional property associated with the interface element that describes a role of the interface element within the application, wherein the caption template is selected based on a value for the additional property associated with the interface element.

5. The method of claim 1, wherein the caption template is also selected based on a value for one of the object properties that describes the detected interaction with the interface element.

6. The method of claim 1, wherein said capturing the object properties further comprises capturing, during the recording, a position of the interaction, wherein the caption template is selected based on a value for the position of the interaction.

7. The method of claim 1, wherein outputting the demonstration presentation comprises:
displaying the captured image; and
displaying the caption or playing an audio representation of the caption.

8. A computer program product comprising a non-transitory computer-readable storage medium with program code stored thereon, the program code comprising:

program code for performing, while a recording application records a demonstration of an application executed concurrently with the recording application, operations comprising:

detecting an interaction with an interface element of the application;

capturing, by the recording application in response to said detecting the interaction, (i) an image of the interface element as displayed on a display device and (ii) a plurality of object properties associated with the interface element, wherein capturing the plurality of object properties comprises storing values of the plurality of object properties that are generated by the interaction with the interface element during execution of the application;

program code for creating, by the recording application, a demonstration presentation comprising the captured image and a caption describing the interaction, the caption created by:

selecting, by the recording application, a caption template from among a plurality of predefined caption templates based on one or more of the stored values for one or more of the object properties captured by the recording application; and inserting, by the recording application, a value of a name of the interface element into the caption template, the name being one of the object properties; and program code for outputting the demonstration presentation on an output device.

9. The computer program product of claim 8, wherein the object properties comprise at least one of a name of the interface element, a role of the interface element, a position of the interface element, a name of a parent of the interface element, a role of the parent of the interface element, or a position of the parent of the interface element.

10. The computer program product of claim 8, wherein the program code for capturing the object properties comprises program code for querying an operating system in which the application is being executed in order to obtain the values of the object properties.

11. The computer program product of claim 8, wherein the program code for capturing the object properties further comprises capturing, during the recording, an additional property associated with the interface element that describes a role of the interface element within the application, wherein the program code for selecting the caption template further comprises program code for selecting the caption template based on a value for the additional property associated with the interface element.

12. The computer program product of claim 8, wherein the program code for selecting the caption template further comprises program code for selecting the caption template based on a value for one of the object properties that describes the detected interaction with the interface element.

13. The computer program product of claim 8, wherein the program code for capturing the object properties further comprises capturing, during the recording, a position of the interaction, wherein the program code for selecting the caption template further comprises program code for selecting the caption template based on a value for the position of the interaction.

* * * * *